United States Patent [19]

Hess

[11] 3,873,190

[45] Mar. 25, 1975

[54] MOUNTING ASSEMBLY FOR EXTERNAL VEHICLE REAR VIEW MIRROR

[75] Inventor: Peter Hess, Coburg, Germany

[73] Assignee: Metallwerk Max Brose & Co., Coburg-Bavaria, Germany

[22] Filed: Aug. 1, 1973

[21] Appl. No.: 384,571

[30] Foreign Application Priority Data

Aug. 9, 1972 Germany............................ 2239257

[52] U.S. Cl............................... 350/289, 74/501 M
[51] Int. Cl............................................... G02b 5/08
[58] Field of Search.......... 74/501 M; 350/288, 289, 350/302, 303, 304, 307, 310

[56] References Cited
UNITED STATES PATENTS

| | | | |
|---|---|---|---|
| 2,656,764 | 10/1953 | Johnson............................... | 350/289 |
| 2,736,231 | 2/1956 | Bauersfeld........................... | 350/310 |
| 2,906,098 | 9/1959 | Mayo................................... | 350/289 |
| 2,906,099 | 9/1959 | Getz..................................... | 350/289 |
| 3,013,392 | 12/1961 | Falge.................................... | 350/289 |
| 3,326,624 | 6/1967 | Von Maydell....................... | 350/288 |
| 3,427,097 | 2/1969 | Dryden................................ | 350/310 |
| 3,480,350 | 11/1969 | Hamby................................ | 350/304 |

*Primary Examiner*—Ronald L. Wibert
*Assistant Examiner*—Michael J. Tokar
*Attorney, Agent, or Firm*—Toren, McGeady and Stanger

[57] ABSTRACT

A mounting assembly is provided for a vehicle rear view mirror whereby the mirror may be located externally of the vehicle and have its viewing position adjusted from within the vehicle. The assembly comprises a base member affixed to the exterior of the vehicle with a mirror adjustably mounted within the base member. Swivel means pivotally mount the mirror to the base member and a pair of fluid controlled elements each extending between the mirror and the base member, and each being adapted to have their lengths adjustably varied by control of fluid pressure thereto, operate to enable adjustment of the positioning of the mirror by pivotal motion thereof about the swivel means. Each of the fluid controlled elements is swivelly interconnected to the mirror and fluid control means operate to enable selective variations from within the vehicle of application of fluid pressure to each of the fluid controlled elements. The swivel means and each of the fluid controlled elements are individually connected to the mirror, respectively, at three spaced apart points not linearly aligned each taken relative to the others. By a further aspect of the invention, the base member is formed of resilient material shaped to define internally thereof a fluid pressure enclosure containing therein a fluid under pressure to impart to the base member dimensional stability while collapsibly supporting the mirror.

13 Claims, 7 Drawing Figures

MOUNTING ASSEMBLY FOR EXTERNAL VEHICLE REAR VIEW MIRROR

BACKGROUND OF THE INVENTION

The present invention relates generally to an externally mounted rear mirror for automotive vehicles. More particularly, the invention relates to a rear view mirror whose position is adjustable from within the vehicle by the application of fluid pressure to fluid controlled elements which operate to effect tilting of the mirror about a swivel connection.

Prior art mounting devices for externally located automotive rear view mirrors which enable adjustment of the mirror from within the vehicle have included adjustment devices such as lever systems or Bowden cable mechanisms. These prior art systems generally comprise mechanical means whereby adjustment of the mirror is enabled, and because of the mechanical nature of the adjusting devices selectivity of the location of a manipulable control member within the vehicle is somewhat limited. Lever systems involving a plurality of levers, and Bowden cable means, are generally complex in design and subject to difficulty in their operation when the direction of motion of the mirror is to be correlated with the direction of motion of the internal control means. The lever system or the Bowden cable device must be designed with extreme care in order to avoid abrupt motion of the mirror during the adjusting procedure.

Other prior art means for adjusting automotive rear view mirrors have involved mechanisms such as electric motors. Although the elements controlling operation of an electric motor may be located within the vehicle with greater location selectivity, such a rear view mirror control system is quite costly.

Known mounting devices enabling adjustment of a rear view mirror from within a vehicle involve drawbacks because, due to the weight of the mechanical adjusting elements, they may become easily misaligned or dislodged from their adjusted position when subjected to jolts or vibrations. Furthermore, it is not uncommon for governmental safety codes to require that the means mounting the mirror and the mechanical adjustment elements of such devices be structured in conformance with regulations aimed at accident prevention. Thus, externally mounted rear view mirrors have been provided with mounting supports including a predetermined breakage site along which the mirror housing will be severed in the event of an accident.

Accordingly, it is an object of the present invention to provide a mounting assembly for an externally mounted automobile rear view mirror which will permit adjustment of the position of the mirror from any desired location within the vehicle.

SUMMARY OF THE INVENTION

Briefly, the present invention may be described as a mounting assembly for a vehicle rear view mirror adapted to be mounted externally of the vehicle and have its position adjusted from within the vehicle, said assembly comprising a base member affixed to the exterior of said vehicle, a mirror adjustably mounted upon said base member, swivel means pivotally mounting said mirror to the base member, a pair of fluid controlled elements each extending between the mirror and the base member, and each adapted to have their lengths adjustably varied by control of fluid pressure applied thereto, means swivelly interconnecting each of said fluid controlled elements to said mirror and fluid control means for selectively individually varying from within the vehicle application of fluid pressure to each of said fluid controlled elements. The swivel means and the fluid controlled elements are each individually connected to the mirror, respectively, at three spaced apart points not linearly aligned each taken relative to both of the others. Selective application of fluid pressure to each of the fluid controlled elements will provide adjustment of the positioning of the mirror by effecting pivotal motion thereof about the swivel means.

By a further aspect of the invention, the base member is formed of resilient material shaped to define internally thereof a fluid pressure enclosure. Fluid under pressure is contained within said enclosure thereby imparting to the base member dimensional stability for supporting the mirror while simultaneously permitting the base member to readily collapse upon impact.

Means for controlling the application of pressure to the pressure controlled elements may be located at any site within the vehicle in view of the fact that the fluid pressure connections are provided by flexible pressure hoses or the like. By utilization of the present invention it becomes unnecessary to provide sealed mounting elements for movable control elements which must extend through the outer walls of the vehicle. Thus, a difficult obstacle encountered in many mechanical mounting devices is overcome. Even in their simplest form, the fluid pressure adjusting elements of the present invention permit a wide range of adjustment of the rear view mirror and the overall assembly is substantially maintenance free. In another aspect of the present invention, the three spaced apart points at which the swivel means and the fluid controlled elements are connected to the mirror may be arranged to form an isosceles triangle with the swivel means being positioned at the apex thereof joining the equal sides. With this arrangement, the mirror may be adjusted with particular ease and uniformity avoiding abrupt movement.

By a further aspect of the invention, the assembly may be designed to prevent pivotal motion of the mirror about the swivel means in directions lying within the plane of the mirror. Such an expedient permits the use of pressure controlled elements which are especially simple in design since they need not support the mirror to prevent motion thereof in undesired directions. In such an embodiment, the system may include guide means interconnecting the base member with the mirror at a point on the mirror opposite to the point at which the swivel means are located. The base member may be formed to define a guide groove which is slidably engaged by a lug attached to the mirror. The lug moves along the guide groove during normal operation of the adjusting elements, but motion transversely of the guide groove is prevented. In addition to preventing motion of the mirror in undesired directions, the aforementioned guide means will also serve simultaneously as friction means which will prevent accidental dislocations in the mirror adjustments as might occur as the result of vibrations.

The pressure controlled elements may be in the form of bellows members. This enables provision of a mounting assembly which can be manufactured in a relatively inexpensive and economical manner and which obviates the use of joints which must permit tilting motions of their extremities with respect to each other. The life of the assembly may be increased by mounting at least one end of the bellows member with a swivel bearing permitting universal tilting action. Utilization of a swivel bearing will operate to reduce the mechanical stresses borne by the bellows walls thereby increasing the life of the bellows.

In another sturdier embodiment of the invention, the pressure controlled elements are formed as a piston and cylinder arrangement with the positioning of the piston within the cylinder determining the positioning of the mirror attached thereto. In this embodiment, the pressure controlled element is provided at both its extremities with a swivel type bearing permitting universal tiling motion and also permitting smoother adjusting movement of the mirror even when larger mirrors are utilized. The swivel bearing may preferably be designed in the form of a ball-and-socket joint.

By a further particularly advantageous aspect of the present invention, the pressure controlled means and the fluid pressure control elements may be designed so that the mirror may be actuated by motion of a manipulable control lever located within the vehicle in a direction identical to the direction to be imparted to the mirror. In such an arrangement, the fluid control means will include two pressure transmitting elements respectively connected by means of conduit lines extending respectively to each of the pressure controlled elements. A control lever may be movably mounted within the vehicle and a pair of lever arms arranged to project laterally therefrom, with each of the lever arms being connected, respectively, to one of the fluid pressure control elements for the purpose of selectively actuating their operation.

Thus, it would be possible to permit adjustment of the mirror in the horizontal direction by a rolling motion of the control lever with vertical adjustment of the mirror being enabled by a tilting motion of the control lever. If the control lever is mounted in a universally pivotable ball-and-socket joint then the mirror may be adjusted horizontally as well as vertically through swivel motions of the control lever and the two lever arms may be arranged for movement within an angle smaller than 180°.

In the embodiment of the invention wherein the fluid pressure control elements comprise a bellows mechanism, a particularly simple design is effected in view of the fact that the bellows need not be mounted to the lever arms by means of joints. However, the life of the fluid pressure control means may be increased where such pressure control elements are designed as a pressure cylinder with a working piston displaceably arranged therein. The adjustability of the control lever and of the mirror in the same directions becomes possible if the lever arm is connected by means of a joint with the piston rod of the working piston or with the pressure cylinder of the pressure controlled elements. If a displacement adjustment joint connects the piston rod with the working piston or pivotally attaches the pressure cylinder or the piston rod, with the joint and the displacement balancing joint permitting at least a single tilting motion around common axes that are parallel to each other but not coincident, similar adjustability may be provided. In order to be able to permit adjustment of the mirror by universal tilting motions of the control lever, a simplified embodiment of the present invention provides that the joint and/or the displacement equalizing joint is designed to be universally tiltable and that the control lever is pivotally attached to a hinged bracket, with the hinged bracket bearing at one end a ball-and-socket joint and, at its opposite end, another displacement equalizing joint whose swivel axes, in the case of a joint or of a displacement equalizing joint designed to be pivotable about a tilting axis, is not parallel to the tilting axis of the joint or of the displacement equalizing joint.

If the rear view mirror is to be utilized on a motor vehicle the fluid pressure control system may be preferably designed as a vacuum system utilizing for its operation vacuum pressure derived from the carburetor system of the motor vehicle. The pressure controlled elements of the mounting assembly may, in such a case, be operated by vacuum and they are provided with spring means to enable length extension thereof.

An important characteristic to be considered in the design of externally mounted rear view mirrors is the reduction of potential accident hazards. In the event that the mounting assembly of a rear view mirror is subjected to impact, the mirror must be able to collapse or to become severed at a predetermined breakage site. Normally, the base member upon which the mirror is mounted is made of metal thereby increasing the likelihood of injuries particularly where, because of the overall design of the assembly, the mounting base must be made somewhat larger in size than usual. In accordance with the present invention, such hazards are obviated by forming the base member of the mounting assembly from resilient material when does not exhibit any structural rigidity. The base member is designed to define internally thereof, at least over a portion of its internal volume, a pressure enclosure which is filled with fluid under pressure to impart dimensional stability to the base member. Of course, such a mirror base member may be utilized not only in connection with externally mounted rear view mirrors but also with mirrors which are mounted internally of the vehicle. Furthermore, such a structure may be used with externally mounted rear view mirrors of standard design which are adjustable from the exterior of the vehicle. Such a structure will not involve any particular collapsing direction and will absorb an impact irrespective of the direction of the origin of the impact. In view of the fact that the base member is made of resilient material, it will be particularly free of unwanted noise and will not cause rattles. Furthermore, in contrast to mounting structures which are formed with a predetermined breaking site, the base member of the present invention may be nondestructively deformed.

It is possible to design the present invention so that the base member defines an internal pressure enclosure throughout only a portion of its internal volume sufficient to impart to such portion of the base member a collapsible characteristic. However, accident hazards will be further reduced if the entire interior of the base member is designed as a pressure chamber or enclosure. The base member may be designed to function simultaneously as a mirror housing and in such case, it will project in any position beyond the lateral edges of a universally movable mirror. In addition to protecting the mirror against soiling during travel, a base member formed of resilient material extending around the lateral edges of the mirror will protect against injury in the event of accidents.

The base member upon which the mirror is mounted may, even after it has been filled with fluid under pressure, retain an aerodynamic shape by the provision of braces or supporting interior walls which operate to increase the dimensional stability of the structure. These interior support walls are provided with apertures for the purpose of permitting equalization of the internal fluid pressure within the base member.

A bag may be placed within the pressure enclosure of the base member to accommodate the fluid under pressure thereby to prevent pressure losses and to permit the use of porous materials such as plastic foams for the manufacture of the base member.

If the pressure within the pressure enclose of the base member is provided at elevated levels, greater rigidity and freedom from vibration may be realized. In order to reduce rigidity in the event of impact, the pressure chamber may be provided with a relief valve through which fluid under pressure may escape when the internal pressure is elevated as a result of impact deforming the base member. The fluid contained therein may thus be permitted to escape through a simple relief valve which is formed with an elastic stopper made of rubber or plastic and attached by press fitting and/or suitable shaping within the device.

In order to enable continued use of the base member after collapsing due to impact, the pressure chamber is provided with an intake valve permitting repeated filling of the chamber with pressure fluid. This intake valve may be designed in such a way that filling of the internal pressurer chamber of the base member can be performed by compressed air inflating devices normally found in automobile service stations.

DETAILED DESCRIPTION OF THE DRAWINGS

The present invention will be better understood by reference to the following detailed description of the preferred embodiments thereof taken in connection with the accompanying drawings wherein.

DETAILED DESCRIPTION OF THE PREFERRED EMBODIMENTS

Figure 1:
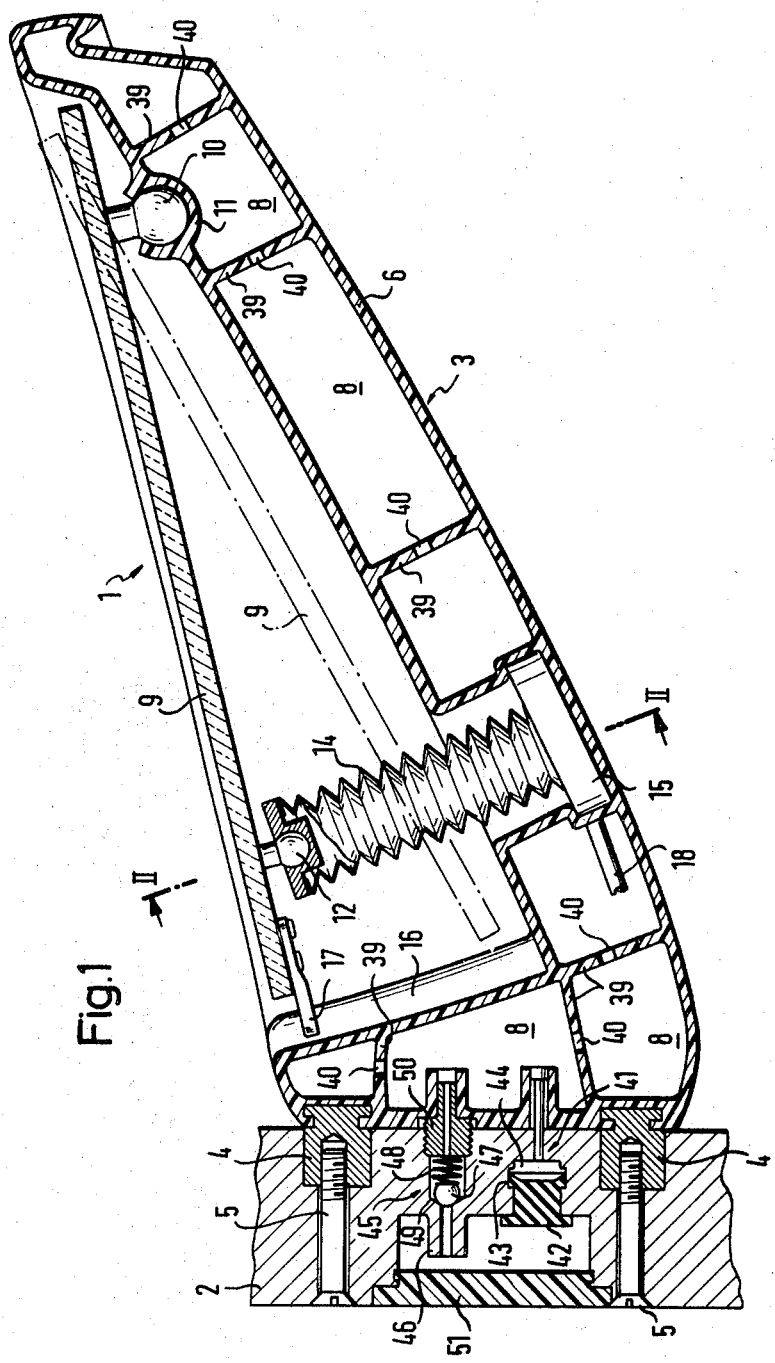
FIG. 1 is a longitudinal sectional view showing an externally mounted rear view mirror in accordance with the present invention.

FIG. 1 depicts an externally mounted automobile rear view mirror assembly 1 affixed to a vertical outer wall of the vehicle by means of a mounting bracket 2. A base member 3, which serves as the primary support element for the assembly, is made from resilient material, such as plastic or the like, and includes mounting elements 4 which operate to enable attachment of the mirror assembly 1 by means of screws 5 to the mounting bracket 2. The base member 3 includes a wall portion 6 and lateral walls 7 which are designed as double-walled structures to form a pressure chamber or enclosure 8 within which fluid under pressure may be contained. The purpose and operation of the pressure chamber 8 will be described in greater detail herein after.

A glass mirror 9 which is set in a metal frame is supported at one end thereof by a ball joint 10 affixed to the mirror on the rear side thereof, with a ball socket 11 formed in the wall portion 6 of the base member 3 engaging the ball 10 to enable universal swiveling or pivotal motion of the mirror 9 relative to the base member 3. The socket 11 engages the ball 10 with a frictional connection and thereby serves to also apply a holding force tending to maintain the mirror 9 in a set position. A pair of ball and socket joints 12 located at a side of the mirror 9 opposite the ball and socket joint 10, 11, also provide support for the mirror 9 with the joints 12 being positioned relative to the ball and socket joint 10 11 in a manner whereby the points of attachment do not lie in a straight line path. In the embodiment shown in FIG. 1 each of the joints 12 are located at the base of an isosceles triangle formed by the points of connection of the ball and socket joint 10, 11 and the joints 12, with the ball joint 10 being located at the apex of the triangle from which the equal sides thereof extend.

Figure 2:
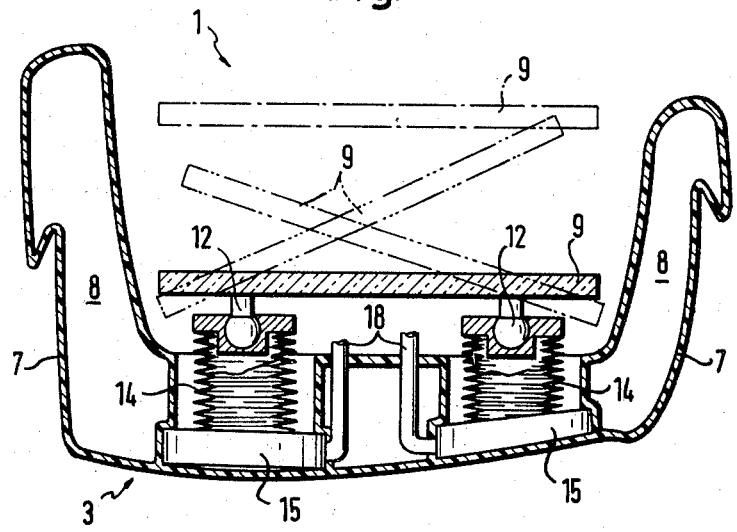
FIG. 2 is a sectional view taken along the line II—II of FIG. 1.

As shown in FIG. 2, the joints 12 are affixed to a pair of pressure controlled members extending between the mirror 9 and the base member 3, said pressure controlled members in the embodiment of FIG. 1 comprising a pair of bellows 14. The bellows 14 are connected at one end to the mirror 9 through the joints 12 and at their opposite ends to the base member 3 by a base plate 15 which is force fitted into a section of the rear wall 6 shaped to hold the base palte 15 by the elastic force of the resilient material forming the wall 6.

Guide means in the form of a guide groove 16 defined in the side wall 7 of the housing 3 and located at a point opposite the ball and socket joint 10, 11 operate to guide the mirror 9 through tilting motion through a horizontal plane around the joint 10, 11. A lug 17 affixed to the end of the mirror 9 is engaged within the guide groove 16 and slides there along when the mirror is tilted or pivoted about the joint 10, 11 through a horizontal plane, which coincides with the plane of the drawing of FIG. 1. Since the guide groove 16 is integrally formed as part of the base member 3 which comprises resilient material, a frictional engagement of the lug 17 within the groove 16 will serve to prevent accidental displacement of the mirror by vibrations or other forces while at the same time enabling longitudinal sliding movement of the lug 17 within the groove 16 when positioning of the mirror is to be effected. Furthermore, it will be noted that the lug 17 may be rotated within the groove 16 when tilting motion of the mirror 9 about an axis lying in the plane of the drawing of FIG. 1 is to be accomplished. That is, when the plane of the mirror 9 which extends perpendicularly to the plane of the drawing of FIG. 1, is to be tilted, such motion will not be obstructed by the engagement by the groove 16 of the lug 17 which will rotate therein.

Each of the bellows 14 are connected to a fluid pressure control element 19 by a pressure line or conduit 18 through which compressed air, hydraulic fluid, or other suitable fluid under pressure may be supplied individually to each of the bellows 14 in order to control their lengths. Increase of pressure within a bellows 14 will cause expansion of the bellows thereby extending its length in order to extend the distance between the base member 3 and the point on the mirror 9 at which the bellows 14 is connected. Spring means (not shown) are also provided to bias the end of the mirror 9 connected to the bellows 14 in a direction toward the base member 3. Accordingly, increase or decrease in the pressure applied to the bellows 14 will cause the mirror 9 to tilt about the ball and socket joint 10, 11 depending upon the pressure levels applied to the individual bellow 14. For example, if the bellows 14 are each extended or contracted in length an equal amount, the mirror 9 will pivot about the swivel joint 10, 11 through a horizontal plane lying in the plane of the drawing of FIG. 1 without any tilting motion of the plane of the mirror extending perpendicularly to the plane of FIG. 1. Alternatively, if either of the bellows 14 are moved to have their lengths extend through different dimensions, the mirror 9 will also undergo a tilting motion whereby the plane of the mirror will be rotated about a generally horizontal axis, i.e., an axis lying in the plane of FIG. 1.

FIG. 1 illustrates the terminal positions of the mirror 9 with respect to tilting of the mirror through a horizontal plane, i.e., rotation about an axis extending perpendicularly to the plane of FIG. 1. When the bellows 14 are completely retracted, the mirror will be positioned as shown by the dotted lines in FIG. 1. Extension of the bellows 14 to their full length will position the mirror as shown in solid line form in FIG. 1.

FIG. 2 illustrates tilting of the mirror about a horizontal axis. When the right hand bellows 14 is extended its full length with the left hand bellows 14 being fully retracted, as seen in FIG. 2, the right hand end of the mirror, as seen in FIG. 2, will be moved away from the base member 3 as shown in dotted line in FIG. 2. Other positions of the mirror affected by operation of the elements previously described and depicted in FIG. 2 will be apparent from the foregoing explanation.

Figure 3:
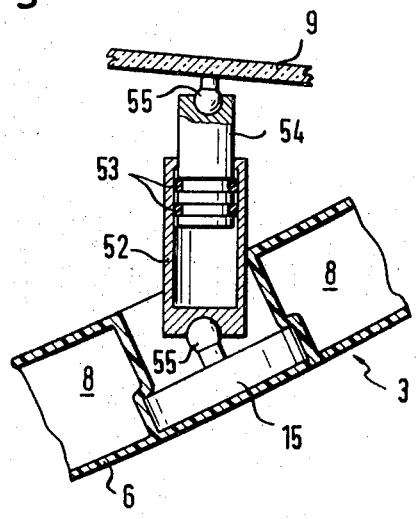
FIG. 3 is a partial sectional view of another embodiment of the invention showing an alternative arrangement for the pressure controlled element.

A second embodiment of the present invention is shown in FIG. 3. In this embodiment, the bellows 14 are replaced by a piston and cylinder arrangement which comprises a cylinder 52 within which a piston 54 is positioned in sliding engagement with a seal therebetween effected by gaskets 53. The piston and cylinder arrangement 52, 54 is universally pivotably mounted to the mirror 9 and to the base plate 15, respectively, by means of a pair of ball and socket joints 55.

Figure 4:
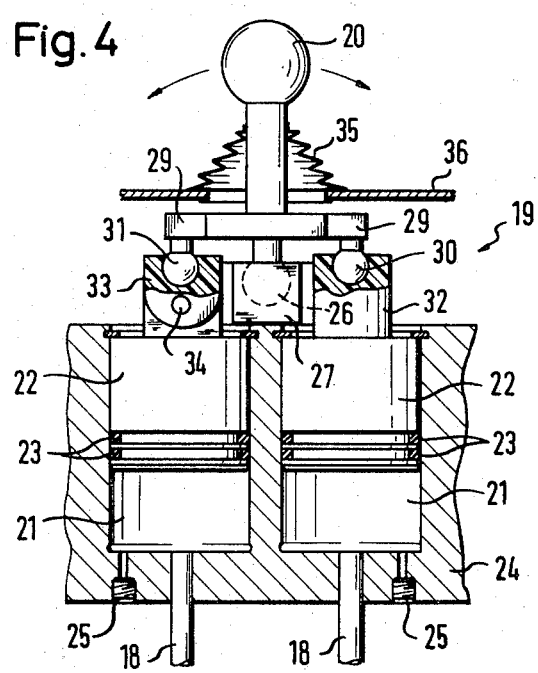
FIG. 4 is a sectional view of the pressure control means of the present invention illustrating the mode whereby one range of motion of a mirror may be effected.
Figure 5:
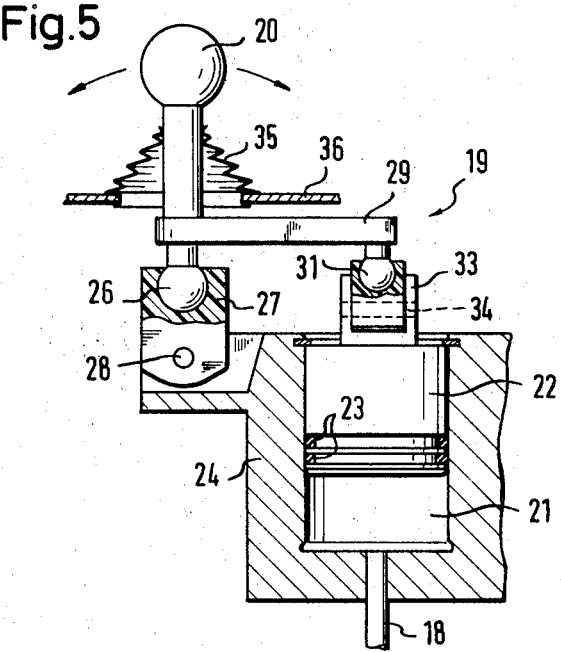
FIG. 5 is a sectional view of the mechanism of FIG. 4 taken transversely thereof illustrating another mode of operation for effecting movement of the mirror through a different range.
Figure 6:
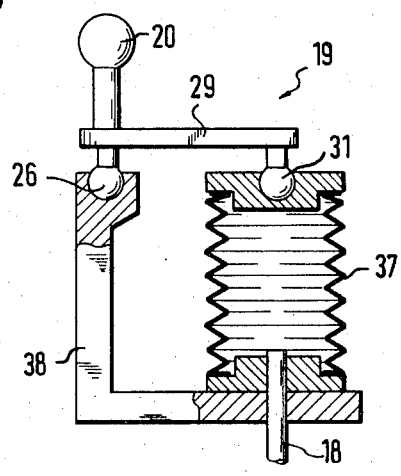
FIG. 6 is a sectional view of another embodiment of the pressure controlled element of the present invention.

A fluid pressure control arrangement 19 for the invention is shown in more detail in FIGS. 4 – 6. The control element 19 comprises a control lever 20 which may be mounted at a location interiorly of the vehicle and arranged to transmit a setting movement to the mirror 9 in a manner whereby movement of the lever 20 is correlated to movement of the mirror 9. If the control lever 20 is tilted in the direction of the arrows, as illustrated in FIG. 4, it will cause tilting of the mirror 9 about a horizontal axis due to unequal settings of the lengths of the pressure controlled elements. Conversely, if the control lever 20 is displaced as shown by the arrows in FIG. 5, the mirror 9 will be pivoted horizontally about a vertical axis since each of the pressure controlled elements will be moved an equivalent length.

In the case of the embodiment illustrated in FIGS. 4 and 5, the fluid pressure control element 19 comprises a pair of cylinders 21 connected through the pressure lines 18, respectively, to one of a pair of bellows 14. Pistons 22 are displaceably arranged within the cylinders 21 and sealing means in the form of gaskets 23 are provided between the pistons 22 and the cylinder housing 24. A closable filling aperture 25 enables filling and evacuation of pressure fluid to and from the cylinder 21. The control lever 20 is pivotally mounted at one end thereof by a bearing 28 located in the cylinder housing 24. A pair of lever arms 29 project at right angles from the control lever 20 and operate to transmit tilting motion of the control lever 20 to the pistons 22. The pistons 22 are connected to the levers 29 by a pair of ball-and-socket joints 30 and 31 with the joint 30 attaching a piston rod 33 of one of the pistons 22 directly to one of the lever arms 29 with the other piston 22 being fastened by means of an adjustable piston rod 33 to the other ball-and-socket joint 31. A piston rod bearing 34 pivotally attaches the pivotable piston rod 33 to the piston 22. A hinged arm 27 and the pivotable piston rod 33 balance the reduced distance between the ball-and-socket joint 26 and the other ball-and-socket joints 30 and 31 in the case of tilting motion of the control lever 20. The selection of these distances controls, among other factors, the transmission ratio by means of which the tilting motion of the control lever 20 is transmitted to the mirror 9. A cover member 35 is provided to cover the opening whereby the control lever 20 extends through a sheet metal wall 36 as shown in FIGS. 4 and 5.

FIG. 6 illustrates a further embodiment of the fluid pressure control element 19 of the present invention wherein a pair of bellows 37 are connected by means of pressure lines 18 with the bellows 14 operating to control positioning of the mirror 9. In view of the fact that the bellows 37 will permit some lateral movement of the ball and socket joints 30 and 31 which join the bellows 37 to the lever arms 29, it is not necessary to provide additional pivotable interconnections other than those shown in FIG. 6 in order to compensate for equalization of the distances between the joint 26 of the control lever 20 and the joints 30 and 31. One leg of a mounting bracket 38 has attached thereto the control lever 20 with its ball and socket joint 26 and, the other leg of the bracket 38 has attached thereto one end of the bellows 37.

It will be apparent from the foregoing that pressure fluid to and from the bellows units 14 mounted in the mirror assembly 1 may be controlled either by operation of the embodiment of the fluid pressure control element 19 shown in FIGS. 4 and 5, or by the embodiment thereof shown in FIG. 6. Manipulation of the control lever 20 will, in the case of the embodiment of FIGS. 4 and 5, move the pistons 22 selectively to change the lengths of each of the bellows units 14. Similarly, manipulation of the control lever in the embodiment of FIG. 6 will extend or retract the bellows 37 thereby providing control of the pressure fluid in the bellows 14 to enable appropriate positioning of the mirror 9 from within the vehicle.

Figure 7:
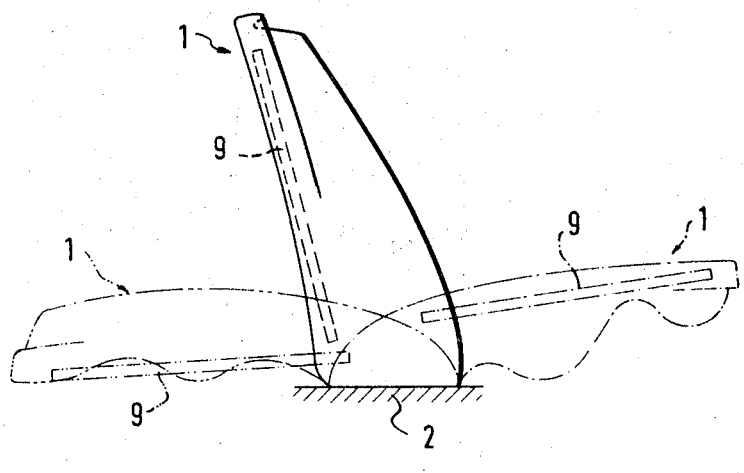
FIG. 7 is a schematic view showing the base support member of the present invention, both prior to and after collapse.

The base member 3 of the rear view mirror assembly 1 is designed to perform a safety function. In view of the fact that the member 3 is formed of resilient material such as rubber or plastic, and owing to its double walled construction which enables the member 3 to define an internal pressure enclosure 8, the overall assembly operates to suitably support the mirror 9 while at the same time being readily collapsible upon impact. Since the member 3 is not, by itself, adequate to provide a rigid support structure for the assembly, the pressure chamber 8 is filled with compressed air or with a fluid under pressure thereby imparting the required rigidity and stiffness to the overall assembly whereby sufficient dimensional stability is obtained to provide the adequate support function. Additionally, by virtue of the resilient nature of the member 3 and since fluid under pressure is the primary means whereby dimensional rigidity is obtained, the device will not be subject to vibration and will be generally rattle-free. As further support to maintain the dimensional integrity of the assembly, internal braces 39 are provided within the chamber 8 with openings 40 therein to permit pressure equalization within the enclosure of the member 3. If the member 3 is subjected to impact or other external pressure, deformation of the assembly will cause pressure within the chamber to rise. Accordingly, the unit includes a relief valve 41 through which pressure can be dissipated to permit collapsing of the assembly upon deformation thereof by impact. The relief valve 41 is designed in the shape of an elastic stopper, formed from rubber or other suitable material, with a collar along a circumference which maintains the stopper in a bore hole 44 appropriately connected with the pressure chamber 8. If the pressure in the chamber 8 rises above a predetermined value, the stopper 42 will be forced out of the bore hole 44 and air or fluid contained within the member 3 may escape. As a result, the base member 3 will lose its rigidity and, as shown in FIG. 7, it may be tilted in any direction and it will thereby assume a generally flaccid state.

The inner chamber 8 of the base member 3 may be refilled after deflation by means of a filler cap 46 which is designed so that it may be utilized in conjunction with common compressed air devices normally found in automobile service stations. A compression spring 48 presses a ball 47 against a valve seat 49 thereby sealing the pressure chamber 8 connected to the filling valve 45 by means of a connecting piece 50. Above the filling valve 45 and the relief valve 41, there is arranged a cover 51 which prevents entry of dirt or other foreign substances.

Although in the embodiment described herein, the assembly is shown with the base member 3 having its entire internal volume formed as a pressure chamber, the device may also be structured with only a portion of its housing designed to define a chamber for holding fluid under pressure. So long as the portion of the mounting is selected to enable yieldable collapse of the assembly upon impact, it will perform the appropriate safety function described. Furthermore, the mirror housing may be made of a porous material with a pressure chamber which is sealed off by means of a plastic bag.

While specific embodiments of the invention have been shown and described in detail to illustrate the application of the inventive principles, it will be understood that the invention may be embodied otherwise without departure from such principles.

What is claimed is:

1. A mounting assembly, for a vehicle rear view mirror adapted to be mounted externally of the vehicle and to have its position adjusted from within the vehicle, said assembly comprising, in combination;
    a base member affixed to the exterior of said vehicle;
    a mirror;
    swivel means pivotally interconnecting said mirror and said base member;
    a pair of fluid controlled elements each extending between said mirror and said base member and each being adapted to have its length adjustably varied by control of fluid pressure applied thereto;
    means swivelly interconnecting each of said fluid controlled elements with said mirror;
    fluid pressure control means comprising a pair of fluid pressure transmitters each connected, respectively, in fluid communication with one of said pair of fluid controlled elements for selectively individually varying application of pressure to said fluid controlled elements;
    said swivel means and said fluid controlled elements each being individually connected to said mirror, respectively, at points arranged in triangular trianglular configuration;
    a controlled lever universal swivel bearing;
    a control lever mounted for universal pivoted motion by said control lever swivel bearing;
    a pair of lever arms extending relative to each other through an angle smaller than 180° connected to and laterally projecting from said control lever, said lever arms being individually connected, respectively, to one of said fluid pressure transmitters to transmit motion of said control lever thereby to effect control of fluid pressure within each of said fluid controlled elements;
    whereby adjusting movement of said mirror may be effected by movement of said control lever in directions generally correlated to the directions of movement of said mirror.

2. A assembly according to claim 1 wherein said mirror is formed in a generally planar configuration, and wherein said assembly includes guide means extending between said mirror and said base member enabling position of said mirror by operation of said fluid controlled elements but preventing pivotal motion of said mirror about said swivel means in directions lying within the plane of said mirror, said guide means comprising a longitudinal groove formed in said base member and a lug affixed to said mirror and positioned for slidable engagement within said groove, said groove being formed to extend in a direction transversely of the plane of said mirror.

3. An assembly according to claim 1 wherein said fluid controlled elements comprise a pair of bellows mechanisms each having a first and a second end with one end of each being attached to said base member and with the opposite end of each said bellows mechanisms being swivelly connected to said mirror by a ball-and-socket joint.

4. An assembly according to claim 1 wherein said fluid controlled elements comprise a pair of fluid cylinders each having a piston slidably positioned in sealing engagement therein with each of said piston and cylinder arrangements being swivelly connected by a balland-socket joint, respectively, to both said mirror and said base member.

5. An assembly according to claim 1 wherein each of said fluid pressure transmitters comprise a bellows mechanism each having a first and a second end, with each of said first and second ends being attached, respectively, between one of said lever arms and a fixed support, at least one of the attachments of said ends comprising a universally pivotable swivel bearing.

6. An assembly according to claim 1 wherein said base member is formed of resilient material shaped to define internally thereof a fluid pressure enclosure containing therein a fluid under pressure imparting to said base member dimensional stability for collapsibly supporting said mirror, said base member being formed with projecting edges extending about said mirror for all positions occupied by said mirror during the operation of the mounting assembly.

7. An assembly according to claim 1 wherein said fluid pressure transmitters comprise a pair of cylinders each having a working piston slidably mounted in sealing engagement therein, each of said piston and cylinder arrangements being in fluid communication with said fluid controlled elements with displacement of said pistons operating to individually control fluid pressure in said fluid controlled elements, said assembly further comprising means swivelly connecting each of said lever arms, respectively, to one of said piston and cylinder arrangements whereby pivotal motion of said control lever will effect relative displacement between said cylinders and said pistons, and a second swivel connection interposed between one of said lever arms and one of said cylinder and piston arrangements to accommodate lateral displacement of said lever arms.

8. An assembly according to claim 7 wherein said control lever is pivotally mounted by a swivel arm extending between one end of said control lever and a fixed point, said swivel arm having one end thereof swivelly connected to an end of said control lever and the other end thereof connected to pivot at least about an axis perpendicularly to said lever arms.

9. An assembly according to claim 6 wherein substantially the entire portion of said base member defines therein an internal volume forming said pressure enclosure and having fluid under pressure contained therein.

10. An assembly according to claim 6 wherein said base member includes integrally formed walls located internally thereof extending to impart enhanced dimensional stability to said base member, said internal walls including portions defining apertures permitting fluid flow therethrough.

11. An assembly according to claim 6 including relief valve means for permitting escape of fluid contained within said fluid enclosure upon increase in the fluid pressure thereof caused by deformation of said base member.

12. An assembly according to claim 11 wherein said relief valve means comprise a stopper member and orifice means shaped to engage said stopper member by a press fit but to enable expulsion of said stopper member upon increase in the fluid pressure in said pressure enclosure caused by deformation of said base member.

13. An assembly according to claim 11 wherein said base member includes a filler valve for enabling refilling of said pressure chamber with fluid under pressure.

* * * * *